Oct. 30, 1962 J. A. CROCKFORD ET AL Re. 25,279

METHOD OF DELIVERING DRUGS INTO ANIMALS

Original Filed Aug. 8, 1957

JACK A. CROCKFORD, ET. AL.
INVENTORS

BY J. Walton Bader

ATTORNEY

United States Patent Office

Re. 25,279
Reissued Oct. 30, 1962

25,279

METHOD OF DELIVERING DRUGS INTO ANIMALS

Jack A. Crockford, Chamblee, and Frank A. Hayes and James H. Jenkins, Athens, Ga., and Seldon D. Feurt, Memphis, Tenn., assignors to Palmer Chemical and Equipment Company, Inc., Atlanta, Ga., a corporation of Georgia Original No. 3,022,785, dated Feb. 27, 1962, Ser. No. 677,141, Aug. 8, 1957. Application for reissue June 21, 1962, Ser. No. 206,123
3 Claims. (Cl. 128—218)

Matter enclosed in heavy brackets [ ] appears in the original patent but forms no part of this reissue specification; matter printed in italics indicates the additions made by reissue.

This invention relates to a novel method of delivering drugs into animals by means of a radically new principle. Specific forms of apparatus for carrying out the method of this invention are disclosed in our co-pending application Serial Number 673,597, filed July 23, 1957, now Patent 2,854,925.

To the extent, therefore, that the instant application shows specific constructions related to the instant method which are not claimed as constructions, such disclosure is not to be considered as a disclaimer of the subject matter involved.

[The novelty of the method of this invention resides in the fact that the triggering of the drug injection means is accomplished at the time of firing of the projectile in which the drug is disposed. Time delay means are provided within the projectile so that the drug is not expelled therefrom, despite triggering of the drug injection means, until a discrete interval of time has elapsed. Thus sufficient time passes to permit the projectile to penetrate the animal despite the triggering of the drug injection means upon firing.]

[Thus a positive action is invariably produced since the point of triggering is always constant.]

*The novelty of the method of this invention resides in the fact that the triggering of the drug injection means is accomplished by the use of a chemical gas producing reaction which is produced within the projectile. In one form of this invention the gas producing reaction is commenced at the time of firing of the projectile and time delay means are provided within the projectile so that the drug is not expelled therefrom, despite commencement of the gas producing reaction, until a discreet interval of time has elapsed.*

*In other forms of the invention other means may be utilized to produce the same result so that a positive action will be invariably produced because the point of triggering is always constant.*

Specific apparatus disclosing a manner in which the method of invention can be carried out is shown in the accompanying drawings. For ease of explanation these drawings will be referred to in the detailed description of this invention and the apparatus described. However such apparatus is not essential to the method of this invention which is broader than the apparatus disclosed.

The apparatus used will now be described by reference to the accompanying drawings which are made a part of this specification, and in which, FIG. 1 is a side perspective view of one form of projectile made in accordance with this invention.

Figures 1, 2, 3, 4:
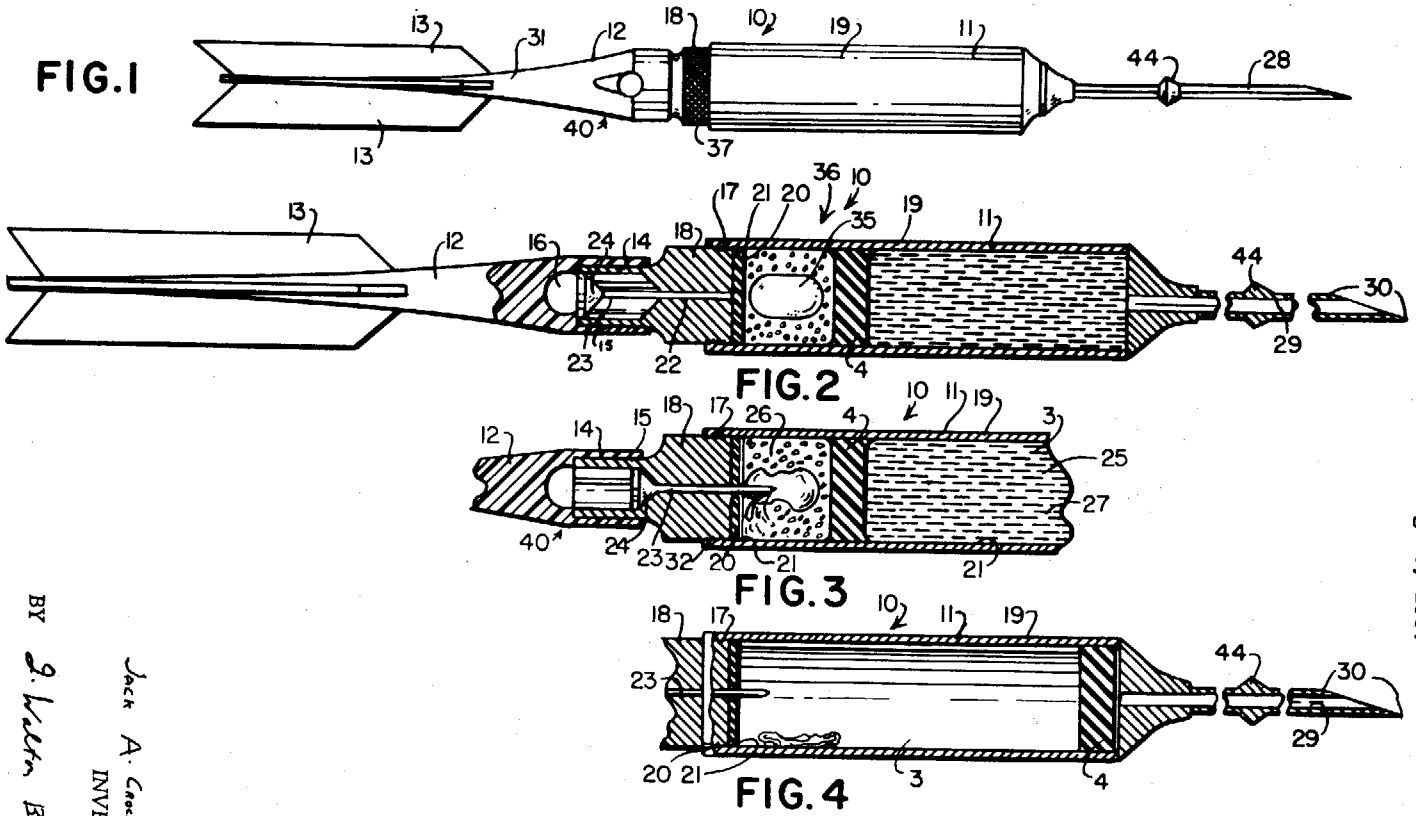
FIG. 2 is a side view, of a construction similar to that of FIG. 1, but with the body portion thereof shown in section so as to illustrate the internal construction of parts.
FIG. 3 is a side detail view, in section, of the rear of the body portion of the projectile shown in FIGS. 1 and 2, showing the means of triggering the injection mechanism upon the firing of the projectile.
FIG. 4 is a side detail view, in section, similar to that of FIG. 3, showing the manner in which the drug is expelled from the projectile after the injection mechanism is triggered and the projectile penetrates the body of an animal.

In order to aid in the description of the method of this invention the specific apparatus shown in the drawings will now be described.

The projectile 10 is formed with a body portion 11. Body portion 11 is in turn divided into a main portion 19 and a cap portion 18. Cap portion 18 is narrowed at its rear portion.

A tail portion 40 is provided which is formed with stabilizing fins 13 secured to a shaft 31. The forward end of shaft 31 is provided with an opening 14 so that tail portion 40 can fit over the rear portion 15 of cap 18.

Opening 14, however, extends rearwardly for a greater distance than would be necessary for fitting over the rear 15 of cap 18 so that an additional opening 16 is provided. Opening 16 permits the entrance of gas therein after firing to trigger the injection mechanism of the projectile.

Main body portion 19 bears female threads 17 at its rear portion and cap 18 bears mating male threads 32 at its forward end portion. A seal 20 of resilient material such as rubber, vinyl resin, or the like is disposed at the forward end portion of cap 18 and abuts against the inner wall 21 of main body portion 19.

Cap 18 is formed with a recess 22 therein which is larger at its rear portion than its forward portion. A forwardly movable pointed needle 23 having a flared tail portion 24 is disposed within recess 22.

Main body portion 19 is hollow and contains an interior cavity 3. A movable propelling member 4 is disposed within cavity 3 and abuts against its inner wall 21.

Propelling member 4 divides cavity 3 into a front drug carrying chamber 25 and a rear reaction chamber 36. A liquid drug 27 is disposed within drug carrying chamber 25.

A needle 28 is secured to the head of projectile 10 and is formed with channel 29 and point 30. Channel 29 communicates with drug carrying chamber 25. A barb 44, to hold needle 28 in place during injection of the drug into the animal, is disposed upon needle 28.

A puncturable container 35, made of rubber, vinyl, or similar resilient material is filled with a liquid gas-producing reactant. The liquid gas-producing reactant is preferably under pressure within container 35.

Adjacent to container 35 and also within reaction chamber 36 is a solid gas-producing reactant 26. The liquid gas-producing reactant and solid gas-producing reactant may be any compounds or combination or solutions of compounds that when combined, will produce emission of gas. Such compounds could be water plus a mixture of citric acid and sodium carbonate; hydrogen peroxide and manganese dioxide, hydrochloric acid and zinc, acetic acid and sodium bi-carbonate, or similar materials.

The method of this invention will now be explained by reference to the gas-propelled projectile shown in the drawings. However any other method of causing a delay of ejection of drug can also be operable in the carrying out of the method of this invention.

The loaded projectile is placed within a gun, preferably an air gun, and fired. Firing of the projectile drives needle 23 forwardly and punctures container 35 thus causing the reactants to intermix and to evolve a gas. However, because of the particle size of the solid gas-producing reactant the liquid cannot act upon all of the particles immediately thus producing a time delay in the forcing of the drug out of the projectile. This time delay is sufficient to permit the projectile to penetrate the body of the animal before the drug is expelled from the projectile.

The method involved is always positive in action and permits an operator to inject drugs into animals at a distance from the animal to avoid injury because of the animal's resistance. The injection of drug is also positive having been triggered by the firing of the projectile.

The specific embodiments of the foregoing invention as set forth in the specification herein are for illustrative purposes and for purposes of example only. Various changes and modifications may obviously be made within the spirit and scope of this invention and would occur to those skilled in this art.

We claim:

1. A method of delivering a liquid drug into an animal while at a distance from said animal but in visual contact therewith comprising the steps of obtaining a mechanically propellable projectile having injection means thereupon and a liquid drug disposed [therewithin mechanically, propelling] *therewithin, mechanically propelling* said projectile into contact with the animal so that the injection means penetrate the animal's body, causing a chemical gas-producing reaction to commence within said projectile wherein the gas produced is operable to propel said drug from said projectile through said injection means, and maintaining said projectile within the body of the animal until the drug is expelled therefrom.

2. A method of delivering a liquid drug into an animal while at a distance from said animal but in visual contact therewith comprising the steps of obtaining a mechanically propellable projectile having injection means thereupon and a liquid drug disposed [therewithin mechanically, propelling] *therewithin, mechanically propelling* said projectile into contact with the animal so that the injection means penetrate the animal's body, causing a plurality of chemical gas-producing reactants to interact within said projectile wherein the gas produced is operable to propel said drug from said projectile through said injection means, and maintaining said projectile within the body of the animal until the drug is expelled therefrom.

3. A method of delivering a liquid drug into an animal while at a distance from said animal but in visual contact therewith comprising the steps of obtaining a mechanically propellable projectile having injection means thereupon and a liquid drug disposed [therewithin mechanically, propelling] *therewithin, mechanically propelling* said projectile into contact with the animal so that the injection means penetrate the animal's body and simultaneously, causing a time delayed chemical gas producing reaction to commence within said projectile wherein the gas produced is operable to propel said drug from said projectile through said injection means, and maintaining said projectile within the body of the animal until the drug is expelled therefrom.

References Cited in the file of this patent or the original patent

UNITED STATES PATENTS

| | | |
|---|---|---|
| 2,348,337 | Francis | May 9, 1944 |
| 2,545,017 | Billingsley | Mar. 13, 1951 |
| 2,845,925 | Crockford et al. | Oct. 7, 1958 |